United States Patent [19]

Hasegawa et al.

[11] 4,123,590

[45] Oct. 31, 1978

[54] DRY WRITING BOARD POSSESSING ANTI-HALATION EFFECT AND PROCESS FOR PRODUCING THE SAME

[75] Inventors: Tetuya Hasegawa; Akihiro Itishasi, both of Tokyo, Japan

[73] Assignee: Pilot Man-Nen-hitsu Kabushiki Kaisha, Tokyo, Japan

[21] Appl. No.: 643,955

[22] Filed: Dec. 23, 1975

[30] Foreign Application Priority Data

Dec. 28, 1974 [JP] Japan .................................. 49-1165

[51] Int. Cl.$^2$ .............................................. B32B 15/04

[52] U.S. Cl. ........................................ 428/450; 35/61; 427/376 D; 427/419 A; 427/419 B; 427/419 C; 427/419 E; 428/469; 428/471; 428/472

[58] Field of Search ............... 428/471, 472, 469, 450; 427/419 A, 419 B, 419 C, 419 E, 376 D; 428/472, 469, 450; 35/61

[56] References Cited

U.S. PATENT DOCUMENTS

| | | | |
|---|---|---|---|
| 2,909,438 | 10/1959 | Kautz | 35/66 |
| 3,397,076 | 8/1968 | Little et al. | 428/471 |
| 3,449,203 | 6/1969 | Fischer | 428/471 |
| 3,458,344 | 7/1969 | Little et al. | 428/471 |
| 3,679,467 | 7/1972 | Betzer | 428/471 |
| 3,765,931 | 10/1973 | Kyri et al. | 428/471 |

*Primary Examiner*—Ronald H. Smith
*Assistant Examiner*—Janyce A. Bell
*Attorney, Agent, or Firm*—Wenderoth, Lind & Ponack

[57] ABSTRACT

A dry writing board possessing an anti-halation effect which comprises a metallic plate having a ground coat fire-coated with a glaze comprising an acid component and a base component, the composition of the glaze being 30 to 45% of silicon oxide, 15 to 25% of titanium oxide, 5 to 10% of sodium oxide, 5 to 15% of potassium oxide, 1 to 5% of calcium oxide, 2 to 5% of aluminum oxide and 10 to 20% of boron trioxide, all percentages being by weight.

6 Claims, 1 Drawing Figure

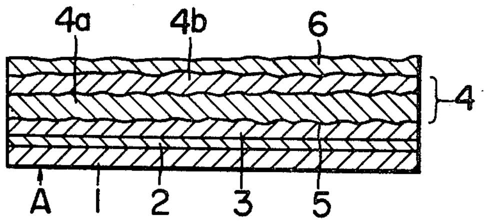
4a
4b
6
4
A
1
2
3
5

DRY WRITING BOARD POSSESSING ANTI-HALATION EFFECT AND PROCESS FOR PRODUCING THE SAME

BACKGROUND OF THE INVENTION

The present invention relates to a novel dry writing-board and a process for producing the same.

A writing-board which has been widely used is a so-called "black board" comprising a wood panel coated with a black or green paint. In writing on the black board, a white or other colored chalk is used. When the black board is erased or wiped, the chalk is powdered and scattered. The powdered chalk not only adheres to the body of the user and his clothes, but it is also inhaled into his body. Therefore, the use of chalk is undesirable for sanitary reasons.

In contrast, there has been developed a so-called "white board" comprising a metal plate covered with any of various white plastic paints. The white board is ordinarily written on with a liquid black or other colored marker. When the inscriptions on the board are to be erased, they are rubbed with a dry cloth or paper. In this case, writing and erasing are not accompanied by any scattering of powder. Therefore, the white board can eliminate the disadvantages encountered in the use of the black board.

However, when a white board having thereon a plastic coating is used for writing, the inscriptions written by a marker quite frequently cannot be completely erased with a dry cloth or paper, and the dye contained in the marker inevitably remains on the surface of the board.

As an attempt to overcome this difficulty, a white board comprising a metal plate coated with a glaze instead of plastics has been proposed. In the case of this white board, the inscriptions written by a marker can be completely erased with a dry cloth or paper.

Such a dry writing board called a white board has been ordinarily prepared by putting on the ground coat of a metal plate a glaze of a composition which is 50 to 55% of silicon oxide, 23 to 30% of titanium oxide, 5 to 6% of sodium oxide, 3 to 6% of potassium oxide and 5.5 to 12.5% of boron trioxide, all percentages being by weight. The glaze is sprayed on the ground coat and the coated plate is fired in a furnace at a temperature of about 800° C.

In the production of such a writing board, it is generally necessary to whiten and vitrify the surface of the board and to increase the acid resistance (anti-rust effect) and covering power (impermeability to the color of the ground coat) of the board. Further, it is necessary that the control of the production process, i.e., firing temperature, be effected with ease. This is because the ground coat or glaze must be fired at a temperature below the $A_3$ transformation point of steel used as a substrate, preferably a temperature of not greater than 850° C. For this reason, the glaze composition contains a greater proportion of titanium oxide and silicon oxide as stated above. However, when the proportion of titanium oxide in the glaze composition exceeds about 29% by weight, the gloss of the surface of the board reaches about 95% which makes it completely impossible for observers to read the inscriptions written on the board at some angles. The gloss of the board is determined under conditions such that both the incidence angle and reflection angle of light are 60° and the gloss of a standard black glass is 100%. If the gloss is not greater than about 65%, the inscriptions written on the board can be easily read.

Heretofore, the halation due to an excessively high surface gloss has been prevented by setting the writing board at a position easy to see by means of a supporting member or inclining the board itself at some angle. In this case, an apparatus for controlling the angle of inclination is required, and the entire writing board becomes large-scaled. Such a large-scaled writing board is also complicated to operate.

SUMMARY OF THE INVENTION

It is an object of the present invention to prevent halation encountered in porcelain enamel writing boards called white boards.

It is another object of the present invention to provide a dry writing board having a novel glaze coating thereon which prevent such halation.

In accordance with the present invention, there is provided a dry writing board comprising a metal plate having a ground coat fire-coated with a glaze comprising an acid component and a base component, the composition of the glaze being 30 to 45% of silicon oxide, 15 to 25% of titanium oxide, 5 to 10% of sodium oxide, 5 to 15% of potassium oxide, 1 to 5% of calcium oxide, 2 to 5% of aluminum oxide and 10 to 20% of boron trioxide, all percentages being by weight.

The present invention also provides a process for producing the above-mentioned dry writing board.

BRIEF DESCRIPTION OF THE DRAWING

The single FIGURE illustrates a model of an enlarged cross sectional view of the dry writing board of the present invention.

DETAILED DESCRIPTION

In the production of the dry writing board of the present invention, a metallic plate is first coated with a ground coat. A low carbon steel is particularly preferred as a substrate. Ordinarily, a porcelain enamel comprises a steel plate having a vitreous material coated thereon. It can be prepared by applying a molten glass on the steel plate and firing the coated plate at a high temperature such that the two quite different materials are integrated with each other. The low carbon steel used should have a very low content of carbon, e.g., not greater than 0.03% carbon, because bubbles or pinholes otherwise occur in the molten glass applied on the steel, contributing largely to the occurrence of chipping and fishscaling of the fired glass after cooling.

A ground coat should ordinarily have the following desirable properties.

1. It can soften and flow at a temperature such that the steel plate is not significantly oxidized and cracking does not occur, i.e., a temperature of not greater than 900° C, preferably not greater than 850° C, and such that it covers the surface of the steel.

2. It has a coefficient of linear expansion of 85 — 105 $\times 10^{-7}$ (over the temperature range of 0° to 100° C) which matches the thermal shrinkage of the steel plate so that it firmly adheres to the plate as a vitreous material after firing and cooling.

3. It has chemical stability and durability to an extent such that it does not deteriorate, at least during storage as a slurry.

In order to satisfy the above-mentioned requirements, the ground coat is limited in its composition within a significantly narrow range. The coverage of the ground coat is 5 to 10 g/dm$^2$, preferably 7 to 8 g/dm$^2$.

After the ground coat has been applied onto the substrate and fired at a temperature of 750° to 850° C, the glaze of the present invention is applied onto the ground coat.

Now, referring to each of the ingredients of the present glaze, silicon oxide as one of the acid components is, at first, present in an amount of 30 to 45% by weight, preferably 35 to 45% by weight. The silicon oxide is the backbone member for the porcelain enamel and in particular, easily reacts with a salt to form a compound. Further, the silicon oxide improves the hardness and strength of the porcelain enamel and imparts thereto resistance against water, acids and alkalis. When the quantity of silicon oxide is less than 30% by weight, the glaze does not become vitreous. On the other hand, in the case where it is greater than 45% by weight, the melting temperature of the glaze is increased. As a result, the fluidity of the glaze decreases and its viscosity increases. Therefore, in order for the glaze to have a viscosity of about $10^3$ to $10^4$ poise suitable for its molten state, the firing temperature should be increased to a temperature above 900° C. Such a high temperature is undesirable because it tends to impart adverse effects on the ground coat.

Titanium oxide as the other acid component, which is called a white pigment, is present in a quantity of 15 to 25% by weight. As stated earlier, the titanium oxide is difficult to dissolve in a melt containing a large amount of silicon oxide so that on cooling the titanium oxide crystallizes and opacities the resulting glaze. Therefore, the titanium oxide has an excellent covering power and prevents the permeation of the color of the ground coat. When the quantity of titanium oxide is less than 15% by weight, good covering power can be no longer expected. In the case where it is greater than 25% by weight, it acts as a burnishing agent or glossing agent which increases the gloss of the surface of the writing board to a great extent as mentioned above.

As a base component, sodium oxide and potassium oxide are present in quantities of 5 to 10% by weight and 5 to 15% by weight, respectively. Since the amount of silicon oxide and titanium oxide in the present invention is less than that of the conventional glaze composition, as can be seen in the foregoing, the hydrophilicity of the present glaze composition is reduced. However, the incorporation of sodium oxide and potassium oxide in the above-mentioned quantities can compensate for the reduction in hydrophilicity of even enhance the hydrophilicity. The sodium oxide and potassium oxide are both strong melting (or flux) components and can prevent an increase in melting or firing temperature due to the addition of aluminum oxide.

In the case where the total quantity of the two alkali ingredients is greater than 25% by weight, the glaze composition loses hydrophilicity, and at the same time gains an extremely increased fluidity of the glaze and is finally weathered. Also, the resulting glaze coating becomes extremely inferior in mechanical strength. Further, although the firing temperature of the glaze is decreased, the coefficient of expansion thereof becomes greater than that ($90$ to $100 \times 10^{-7}$) of the metal substrate (a low carbon steel), so that the occurrence of cracks is promoted. When the total quantity of the two alkali ingredients is less than 10% by weight, the glaze is inferior in acid resistance.

Boron trioxide may be added in a quantity of 10 to 20% by weight. Boron trioxide ($B_2O_3$) is classified as a base component in the present invention although this component may be classified as an acid component in some cases. This material acts as a dispersing agent and a stabilizer for a molten glaze and imparts chemical durability to the molten glaze. When the quantity of boron trioxide is less than 10% by weight, such effects cannot be obtained. On the other hand, in the case where the added boron trioxide is greater than 20% by weight, the durability of the glaze is reduced and simultaneously, pinholes and cracks tend to occur on the surface of the glaze.

Although the above-mentioned ingredients all have been employed in a glaze for the conventional porcelain enamel writing board, the glaze of the present invention includes 2 to 5% by weight of aluminum oxide and 1 to 5% by weight of calcium oxide in addition to the conventional ingredients. The incorporation of these two ingredients into the present glaze composition makes it possible to prevent halation of the writing board due to light. In particular, if the aluminum oxide is added in a quantity such that the weight ratio of silicon oxide to aluminum oxide is from 6 to 22.5, it is possible to reduce the gloss of the resulting writing board to the order of 40 to 65%.

The aluminum oxide also serves to control the fluidity of the molten glaze and acts as a stabilizer when the molten glaze is fused to the substrate. In order to maintain the anti-abrasion and chemical durability of the glaze coating, the aluminum oxide may be suitably added in a quantity of 2 to 5% by weight. Since the aluminum oxide forms fine crystals during the firing of the glazed substrate, a matted surface in a suitable dull state can be obtained. Further, the aluminum oxide also acts as an opacitying agent because it is partially present in a non-crystallized state in the final glaze. When the aluminum oxide is present in a quantity of 2 to 5% by weight, the roughness of the surface produced will be most suitable. When the quantity of the aluminum oxide is in excess of 5% by weight, an extremely rough matte is formed and the surface gloss is reduced. Further, the molten glaze is not fused to the substrate on cooling. That is, the molten glaze has high surface tension and becomes heterogeneous leading to the formation of a spotted surface. In the case where the quantity of the aluminum oxide is greater than 5% by weight, the viscosity of the molten glaze is increased as is the case with the silicon oxide, and it is thus necessary to increase the firing temperature.

In accordance with the present invention, the quantities of the silicon oxide and titanium oxide are less than that used in the conventional glaze composition, and the acid resistance and covering power of the resulting glaze are decreased, accordingly. However, the presence of the aluminum oxide in the specified quantity can compensate for the reduction in acid resistance and covering power.

The calcium oxide is an auxiliary flux for the sodium oxide and potassium oxide, and also promotes the crystallization of the aluminum oxide. The calcium oxide starts to melt at a temperature of about 500° C by the reaction with the titanium oxide, and serves to suppress the increase in firing temperature.

The glaze composed of the above-mentioned ingredients and having a suitable particle size is uniformly applied onto the ground coat with a coverage of 0.5 to 5 g, preferably 1 to 3 g per dm$^2$, by means of a spray, and the coated substrate is fired in a furnace at a temperature of 750° to 850° C for 2 to 3 minutes. The coverage specified above is suitable for cleaning the surface of the product and preventing the crack of the product due to thermal shrinkage.

Although it has been heretofore considered that the molten glaze is homogeneous, it has recently been determined by a super-microscopic observation, e.g., by means of an X-ray diffraction method, that the molten glaze partially forms a heterogeneous layer. We have made a deduction from the status of crystal deposition as to which ingredients form a homogeneous or heterogeneous layer through the crystallization phenomenon of the molten glaze and have arrived at one model as shown in the drawing. As can be seen from the drawing, it is considered that each of the ingredients form three layers. In addition, the crystallization of the molten glaze has an influence upon the milk-white color and mechanical strength of the resulting glaze.

The drawing is an enlarged cross sectional view of the writing board (A) of the present invention, which is assumed to be one model. In the drawing, 1 is a metal plate and 2 is a ground coat. It is considered that a first layer 3 of aluminum oxide, boron trioxide as a dispersing agent, and calcium oxide as a stabilizer is first formed on the ground coat 2. The major portion of the aluminum oxide and calcium oxide having a high liquid phase temperature first deposits in an amorphous state in the lowermost layer together with the boron trioxide through a certain type of glass phase separation developed by a heating phenomenon of the glaze liquid because the former two materials have a fine particle size. As stated hereinbefore, the calcium oxide reduces a high firing temperature due to the presence of the aluminum oxide and promotes the crystallization of the aluminum oxide at a relatively low temperature of 700° to 800° C, thereby imparting opacity and good mechanical properties to the resulting glaze.

The boron trioxide is added to form a vitreous aluminum oxide and to completely bond the first layer 3 and a second layer 4 (a vitreous silicon oxide-titanium oxide layer) to each other. The calcium oxide alone cannot completely bond these two layers.

On the first layer 3 is formed the second layer 4 of silicon oxide and titanium oxide which is considered to be composed of an opacitated low layer 4*a* and a vitreous upper layer 4*b* containing a larger quantity of silicon oxide, which layers are formed through phase change. The lower layer 4*a* of the second layer serves to cover the ground coat 2 (ordinarily black). The titanium oxide is crystallized as fine crystals in the vitreous silicon oxide between the first layer 3 containing the aluminum oxide and a third layer 6 containing alkali oxides as described hereinafter in the course of the phase separation and crystallization of the molten glaze, where it acts as a glass forming agent and an opacifying agent to prevent the permeation of the ground coat which cannot be completely covered by the aluminum oxide.

In this way, the interface between the first layer 3 and the lower layer 4*a* of the second layer is shaped into a rough surface 5 of irregularity which exhibits a light diffusing effect, thereby reducing halation effect due to light. A writing board coated with a conventional glaze containing practically no aluminum oxide and calcium oxide could not provide such effects. In accordance with the present invention, the advantage of halation prevention has been attained by adding these two oxides to the conventional glaze composition to form the above-mentioned rough surface. Further, the rough surface is represented as a roughness of the second layer.

Finally, the sodium oxide and potassium oxide which have a low liquid phase temperature and high fluidity and are difficult to crystallize are deposited as a third layer 6 in an amorphous state in the uppermost portion while undergoing an extreme reduction in crystallizing propensity with the addition of the aluminum oxide. As stated hereinbefore, these alkali oxides impart the required hydrophilicity to the writing board.

The porcelain enamel writing board thus produced exhibits an excellent effect of preventing halation due to light without the use of any other particular apparatus. In addition, the writing board retains the acid resistance, hydrophilicity and covering power possessed by the conventional porcelain enamel writing board of this type. In particular, when the prsesent writing board is used in writing, both writing by a liquid marker and erasing by a dry cloth or paper can be easily carried out in the same manner as in the conventional writing board. Further, the firing temperature of the glaze is reduced, whereby control of the temperature in the production process is particularly easy. By adjusting the composition of the glaze as stated above, the present invention readily provides a porcelain enamel writing board free of halation at low cost.

In order to indicate more fully the nature and utility of this invention, the following specific examples of practice are set forth, it being understood that these examples are presented as illustrative only and that they are not intended to limit the scope of the invention.

EXAMPLE 1

A low carbon steel plate having the following composition was used as a metal plate: 0.03% carbon, 0.3% manganese, 0.018% phosphorus, 0.015% sulfur, trace silicon, and the balance being essentially iron. The steel plate had a thickness of 0.4 mm, a tensile strength of 28 kg/mm$^2$, an Erichsen value of 9.5 mm and an elongation of 38.5%.

On the steel plate was applied a ground coat having the following composition (% by weight): silicon oxide ($SiO_2$) 56.7, aluminum oxide ($Al_2O_3$) 0.5, boron trioxide ($B_2O_3$) 16.8, sodium oxide ($Na_2O$) 14, potassium oxide ($K_2O$) 4, calcium oxide (CaO) 2.9, nickel oxide (NiO) 1.9 and manganese oxide ($MnO_2$) 3.2. Among these oxides, calcium oxide, nickel oxide, and manganese oxide are adherence promoting agents for the steel plate.

After the plate was fired at a temperature of 830° C for 4 minutes, a glaze was applied onto the ground coat with a covering of 1.5 to 2.5 g/dm$^2$ by spraying. The glaze was prepared with the following composition.

| | % by weight |
|---|---|
| Acid component | |
| Silicon oxide ($SiO_2$) | 45 |
| Titanium oxide ($TiO_2$) | 25 |
| Base component | |
| Sodium oxide ($Na_2O$) | 5 |
| Potassium oxide ($K_2O$) | 10 |
| Calcium oxide (CaO) | 1 |
| Aluminum oxide ($Al_2O_3$) | 4 |
| Boron trioxide ($B_2O_3$) | 10 |

These ingredients were intimately mixed with the addition of water to form a slurry. Then, milling clay and an electrolyte such as magnesium carbonate were added to the slurry to adjust the slurry to a suitable particle size. The resulting slurry was used in the manner described above.

The glazed plate was fired in an electric furnace at a temperature of about 830° C for 2½ minutes to produce a white porcelain enamel writing board. The resultant writing board had a surface gloss of 60% and exhibited an excellent anti-halation effect. The writing board had a surface roughness of 3 to 5 μ and a remarkably decreased gloss, and could be easily written on with a liquid ink marker and erased with a cloth or paper.

EXAMPLES 2 THROUGH 6

Five writing boards according to the present invention and one writing board according to the prior art were prepared using the glaze compositions and preparation conditions indicated in the following table. The substrate and ground coat were the same as described in Example 1. The resulting boards were measured for various properties. The results are also shown in the following table.

| Example | | 2 | 3 | 4 | 5 | 6 | Prior art |
|---|---|---|---|---|---|---|---|
| (% by weight) | $SiO_2$ | 30 | 40 | 40 | 40 | 45 | 50 |
| | $TiO_2$ | 20 | 15 | 17 | 20 | 25 | 29 |
| (% by weight) | $Na_2O$ | 5 | 10 | 10 | 5 | 7 | 5 |
| | $K_2O$ | 15 | 10 | 10 | 15 | 8 | 6 |
| (% by weight) | $CaO$ | 5 | 5 | 3 | 3 | 1 | — |
| | $Al_2O_3$ | 5 | 5 | 5 | 2 | 4 | — |
| (% by weight) | $B_2O_3$ | 20 | 15 | 15 | 15 | 10 | 10 |
| Firing temperature (° C) | | 830 | 830 | 820 | 790 | 760 | 800 |
| Firing time (minute) | | 3 | 2.5 | 2 | 2.5 | 3 | 2 |
| Surface gloss (%) | | 40 | 45 | 45 | 50 | 65 | 95 |
| Surface roughness (μ) | | 8-10 | 7-9 | 6-8 | 5-6 | 4-5 | 3-6 |
| Surface resistivity at a relative humidity of 60% (Ω) | | $10^5$ | $10^6$ | $10^6$ | $10^7$ | $10^5$ | $10^{12}$ |

The inscriptions written on each board could be completely erased by a dry cloth or paper. It is apparent from the table that the writing board of the present invention is much lower in surface gloss than the prior art writing board.

In examples 1 through 6 and the prior art example, all the properties of the writing board were determined according to the following methods.

(1) Gloss was measured under conditions such that both incidence angle and reflection angle were 60° and the gloss of a standard black glass was 100%, use being made of a Gloss Meter GM-3 (manufactured by Murakami Color Research Institute K.K., Tokyo, Japan).

(2) Surface roughness was measured under conditions of a 5μ radius of a touch needle, a measuring pressure of 1 g, and a sliding rate of 3 mm/sec with the use of a SE-O Type Surface Roughness Meter (manufactured by Kosaka Research Institute K.K., Tokyo, Japan).

(3) Surface resistivity (hydrophilicity) was measured as follows. A sample of the writing board was completely dried by means of an infrared ray heater and cooled to a temperature of 25° C. The sample was then left standing in a desiccator saturated with humidity for 24 hours. The wetted sample was measured for resistivity by using an Electro Meter TR-84M Type (manufactured by Takeda Riken K.K., Tokyo, Japan).

We claim:

1. A dry, enameled writing board possessing an anti-halation effect which comprises a steel plate, a ground coat on said steel plate, and a multi-layered fire-coated glaze on said ground coat, the multi-layered fire-coated glaze consisting essentially of 30 to 45% silicon oxide, 15 to 25% titanium oxide, 5 to 10% sodium oxide, 5 to 15% potassium oxide, 1 to 5% calcium oxide, 2 to 5% aluminum oxide and 10 to 20% boron trioxide, all percentages being by weight, said fire-coated glaze being composed of the following layers, in an order beginning nearest said ground coat: a first layer of aluminum oxide, calcium oxide and boron trioxide, a second layer of silicon oxide and titanium oxide formed on said first layer, and a third layer of sodium oxide and potassium oxide formed on said second layer, the interface between said first layer and said second layer being a rough surface of irregularities.

2. The board according to claim 1 wherein said steel plate is a steel plate having a composition, by weight, of 0.03% carbon, 0.3% manganese, 0.018% phosphorus, 0.015% sulfur and trace silicon, the balance being essentially iron; said ground coat has a composition, by weight, of 56.7% $SiO_2$, 0,5% $Al_2O_3$, 16.8% $B_2O_3$, 14% $Na_2O$, 4% $K_2O$, 2.9% $CaO$, 1.9% $NiO$ and 3.2% $MnO_2$; and said glaze consists essentially of, by weight, 45% $SiO_2$, 25% $TiO_2$, 5% $Na_2O$, 10% $K_2O$, 1% $CaO$, 4% $Al_2O_3$ and 10% $B_2O_3$.

3. The board according to claim 1 wherein said ground coat has a softening temperature of not greater than 900° C and a coefficient of linear expansion of $85-105 \times 10^{-7}$ over a temperature range of 0° to 100° C.

4. The board according to claim 1 wherein the coverage of the ground coat is 5 to 10 g/dm² and the coverage of the glaze is 0.5 to 5 g/dm².

5. The board according to claim 4 wherein the coverage of the ground coat is 7 to 8 g/dm².

6. The board according to claim 4 wherein the coverage of the glaze is 1 to 3 g/dm².

* * * * *